United States Patent
Kray et al.

(10) Patent No.: US 11,111,815 B2
(45) Date of Patent: Sep. 7, 2021

(54) FRANGIBLE GAS TURBINE ENGINE AIRFOIL WITH FUSION CAVITIES

(71) Applicant: General Electric Company, Schenectady, NY (US)

(72) Inventors: Nicholas Joseph Kray, Mason, OH (US); Nitesh Jain, Bangalore (IN); Daniel Edward Mollmann, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 170 days.

(21) Appl. No.: 16/161,253

(22) Filed: Oct. 16, 2018

(65) Prior Publication Data

US 2020/0116045 A1    Apr. 16, 2020

(51) Int. Cl.
    *F01D 5/14*   (2006.01)
    *F01D 21/04*  (2006.01)
    (Continued)

(52) U.S. Cl.
    CPC .......... *F01D 21/045* (2013.01); *F01D 5/147* (2013.01); *F01D 5/282* (2013.01); *F01D 11/12* (2013.01);
    (Continued)

(58) Field of Classification Search
    CPC ...... F01D 11/12; F01D 21/045; F01D 11/122; F01D 11/125; F01D 5/16; F01D 5/26; F01D 5/027
    See application file for complete search history.

(56) References Cited

U.S. PATENT DOCUMENTS 2,412,615 A * 12/1946 Howard .................... F01D 5/04
                                                      416/229 R
3,096,930 A    7/1963  Meyerhoff
                (Continued)

FOREIGN PATENT DOCUMENTS

CN    103628923 B    3/2016
CN    106460527 A    2/2017
            (Continued)

OTHER PUBLICATIONS

Young's Modulus and Specific Stiffness—University of Cambridge (Year: 2016).*

(Continued)

*Primary Examiner* — David E Sosnowski
*Assistant Examiner* — Wesley Le Fisher
(74) *Attorney, Agent, or Firm* — Dority & Manning, P.A.

(57) ABSTRACT

An airfoil defining a span extending between a root and a tip and a chord at each point along the span extending between a leading edge and a trailing edge. The airfoil includes a frangible airfoil portion at the tip extending between the leading edge and the trailing edge and extending between the tip and a frangible line along the span. The frangible airfoil portion includes an exterior surface. The exterior surface at least partially defines at least one fusion cavity at least partially defining the frangible line. The airfoil further includes a residual airfoil portion extending from the frangible line to the root along the span. The residual airfoil portion meets the frangible airfoil portion at the frangible line. As such, the frangible airfoil portion deforms or partially or fully detaches relative to the residual airfoil portion at the frangible line following an event creating imbalance.

20 Claims, 9 Drawing Sheets

(51) Int. Cl.
*F01D 5/28* (2006.01)
*F01D 11/12* (2006.01)
(52) U.S. Cl.
CPC .. *F05D 2240/307* (2013.01); *F05D 2300/603* (2013.01)

(56) References Cited

U.S. PATENT DOCUMENTS

| | | | |
|---|---|---|---|
| 3,156,808 A | 11/1964 | Davies et al. | |
| 3,175,804 A | 3/1965 | Bunger | |
| 3,394,918 A | 7/1968 | Wiseman | |
| 3,626,568 A | 12/1971 | Silverstein et al. | |
| 3,761,201 A | 9/1973 | Silverstein et al. | |
| 4,000,956 A | 1/1977 | Carlson et al. | |
| 4,022,540 A | 5/1977 | Young | |
| 4,022,547 A | 5/1977 | Stanley | |
| 4,043,703 A | 8/1977 | Carlson | |
| 4,071,184 A | 1/1978 | Carlson et al. | |
| 4,111,600 A | 9/1978 | Rothman et al. | |
| 4,426,193 A | 1/1984 | Carlson | |
| 273,037 A | 3/1984 | Dodge | |
| 4,971,641 A | 11/1990 | Nelson et al. | |
| 5,112,194 A | 5/1992 | More | |
| 5,123,813 A | 6/1992 | Przytulski et al. | |
| 5,129,787 A | 7/1992 | Violette et al. | |
| 5,141,400 A | 8/1992 | Murphy et al. | |
| 5,222,297 A | 6/1993 | Graff et al. | |
| 5,269,658 A | 12/1993 | Carlson et al. | |
| 5,363,554 A | 11/1994 | Partridge et al. | |
| 5,375,978 A | 12/1994 | Evans et al. | |
| 5,392,514 A | 2/1995 | Cook et al. | |
| 5,449,273 A | 9/1995 | Hertel et al. | |
| 5,486,096 A | 1/1996 | Hertel et al. | |
| 5,520,532 A | 5/1996 | Reinfelder et al. | |
| 5,580,217 A | 12/1996 | Richards et al. | |
| 5,738,491 A | 4/1998 | Lee et al. | |
| 5,836,744 A | 11/1998 | Zipps et al. | |
| 5,843,354 A | 12/1998 | Evans et al. | |
| 5,844,669 A | 12/1998 | Wang et al. | |
| 5,908,285 A | 6/1999 | Graff | |
| 5,935,360 A | 8/1999 | Griggs | |
| 5,939,006 A | 8/1999 | Wang et al. | |
| 6,146,099 A | 11/2000 | Zipps et al. | |
| 6,241,469 B1 | 6/2001 | Beeck et al. | |
| 6,290,895 B1 | 9/2001 | Wang et al. | |
| 6,294,113 B1 | 9/2001 | Woodmansee et al. | |
| 6,402,469 B1 | 6/2002 | Kastl et al. | |
| 6,413,051 B1 | 7/2002 | Chou et al. | |
| 6,516,865 B1 | 2/2003 | Beeck et al. | |
| 6,648,597 B1* | 11/2003 | Widrig | C04B 37/001 415/200 |
| 6,709,230 B2 | 3/2004 | Morrison et al. | |
| 6,843,565 B2 | 1/2005 | Evans et al. | |
| 7,033,131 B2* | 4/2006 | Schreiber | F01D 5/147 415/12 |
| 7,114,912 B2* | 10/2006 | Gerez | F01D 21/04 415/9 |
| 7,736,130 B2 | 6/2010 | Schilling et al. | |
| 7,780,410 B2 | 8/2010 | Kray et al. | |
| 7,794,197 B2 | 9/2010 | Thompson et al. | |
| 7,837,446 B2 | 11/2010 | McMillan | |
| 7,946,827 B2* | 5/2011 | Beckford | F01D 5/28 416/239 |
| 7,972,109 B2 | 7/2011 | Crall et al. | |
| 8,038,408 B2 | 10/2011 | McMillan | |
| 8,083,487 B2 | 12/2011 | Wood et al. | |
| 8,100,662 B2 | 1/2012 | Schreiber | |
| 8,109,734 B2 | 2/2012 | Backhouse | |
| 8,146,250 B2 | 4/2012 | Moroso | |
| 8,167,572 B2 | 5/2012 | Tardif et al. | |
| 8,234,990 B2 | 8/2012 | Xie et al. | |
| 8,251,640 B2 | 8/2012 | Beckford et al. | |
| 8,366,378 B2 | 2/2013 | Beckford et al. | |
| 8,459,955 B2 | 6/2013 | McMillan et al. | |
| 8,573,936 B2 | 11/2013 | Lafont | |
| 8,647,072 B2 | 2/2014 | McMillan | |
| 8,685,297 B2 | 4/2014 | Schreiber | |
| 9,085,989 B2 | 7/2015 | Shah et al. | |
| 9,157,139 B2 | 10/2015 | Rajagopalan | |
| 9,321,100 B2 | 4/2016 | Dambrine et al. | |
| 9,410,437 B2 | 8/2016 | Paige et al. | |
| 9,475,119 B2 | 10/2016 | Cui et al. | |
| 9,556,742 B2 | 1/2017 | Parkin et al. | |
| 9,689,269 B2 | 6/2017 | Bottome | |
| 9,878,501 B2 | 1/2018 | Zatorski et al. | |
| 9,914,282 B2* | 3/2018 | Roach | F01D 5/282 |
| 9,945,234 B2 | 4/2018 | Jevons et al. | |
| 9,995,164 B2 | 6/2018 | Nishijima et al. | |
| 2002/0164253 A1* | 11/2002 | von Flotow | F01D 5/16 416/248 |
| 2005/0106002 A1 | 5/2005 | Gerez et al. | |
| 2006/0188736 A1 | 8/2006 | Luthra et al. | |
| 2007/0036658 A1 | 2/2007 | Morris | |
| 2007/0202296 A1 | 8/2007 | Chandrasekaran et al. | |
| 2008/0273983 A1 | 11/2008 | Clark et al. | |
| 2009/0035131 A1 | 2/2009 | McMillan | |
| 2009/0269203 A1 | 10/2009 | Care et al. | |
| 2010/0008785 A1* | 1/2010 | Tardif | F01D 5/16 416/223 R |
| 2010/0054937 A1 | 3/2010 | Beckford et al. | |
| 2010/0150707 A1 | 6/2010 | Jevons | |
| 2010/0242843 A1 | 9/2010 | Peretti et al. | |
| 2010/0296942 A1 | 11/2010 | Jevons | |
| 2011/0023301 A1 | 2/2011 | Jones | |
| 2011/0027096 A1 | 2/2011 | Northfield | |
| 2011/0049297 A1 | 3/2011 | Jevons et al. | |
| 2011/0052405 A1 | 3/2011 | Parkin | |
| 2011/0129351 A1 | 6/2011 | Das et al. | |
| 2011/0182743 A1 | 7/2011 | Naik | |
| 2011/0194941 A1 | 8/2011 | Parkin et al. | |
| 2011/0217160 A1 | 9/2011 | McMillan | |
| 2011/0223027 A1 | 9/2011 | Klinetob et al. | |
| 2011/0299990 A1 | 12/2011 | Marra et al. | |
| 2012/0003100 A1 | 1/2012 | James et al. | |
| 2012/0021243 A1 | 1/2012 | Kray et al. | |
| 2012/0028055 A1 | 2/2012 | Schmidt | |
| 2012/0034089 A1 | 2/2012 | Wadewitz et al. | |
| 2012/0051935 A1 | 3/2012 | Naik et al. | |
| 2012/0082556 A1 | 4/2012 | Macchia et al. | |
| 2012/0100006 A1 | 4/2012 | Merriman et al. | |
| 2015/0218953 A1 | 8/2015 | Bottome | |
| 2016/0123159 A1 | 5/2016 | Thompson | |
| 2016/0167269 A1 | 6/2016 | Pautard | |
| 2016/0341221 A1* | 11/2016 | Twelves, Jr. | F04D 29/325 |
| 2017/0226867 A1 | 8/2017 | Nandula et al. | |
| 2017/0254207 A1 | 9/2017 | Schetzel et al. | |
| 2017/0321714 A1 | 11/2017 | Jain et al. | |
| 2017/0335856 A1 | 11/2017 | Lander et al. | |
| 2017/0363062 A1 | 12/2017 | Merzhaeuser et al. | |
| 2017/0370376 A1 | 12/2017 | Kray et al. | |
| 2018/0119551 A1 | 5/2018 | Romero et al. | |
| 2018/0163743 A1* | 6/2018 | Turner | F04D 29/526 |
| 2018/0178489 A1 | 6/2018 | M'Membe et al. | |
| 2019/0048889 A1* | 2/2019 | Roberge | F04D 29/325 |
| 2019/0072106 A1* | 3/2019 | Husband | F04D 29/526 |

FOREIGN PATENT DOCUMENTS

| | | |
|---|---|---|
| DE | 10305351 A1 | 8/2004 |
| EP | 0526057 A1 | 2/1993 |
| FR | 2953225 A1 | 6/2011 |
| FR | 2994708 A1 | 2/2014 |
| GB | 2450139 A | 12/2008 |
| JP | 2001041002 A | 2/2001 |
| WO | WO2008122751 A2 | 10/2008 |

OTHER PUBLICATIONS

Engineering Toolbox—Young's Modulus Table (Year: 2003).*
Volume-Issue Number, Location Published, Date, Pages.

(56) References Cited

OTHER PUBLICATIONS

Combined Chinese Office Action and Search Report Corresponding to Application No. 201910982773 dated Oct. 12, 2020.

* cited by examiner

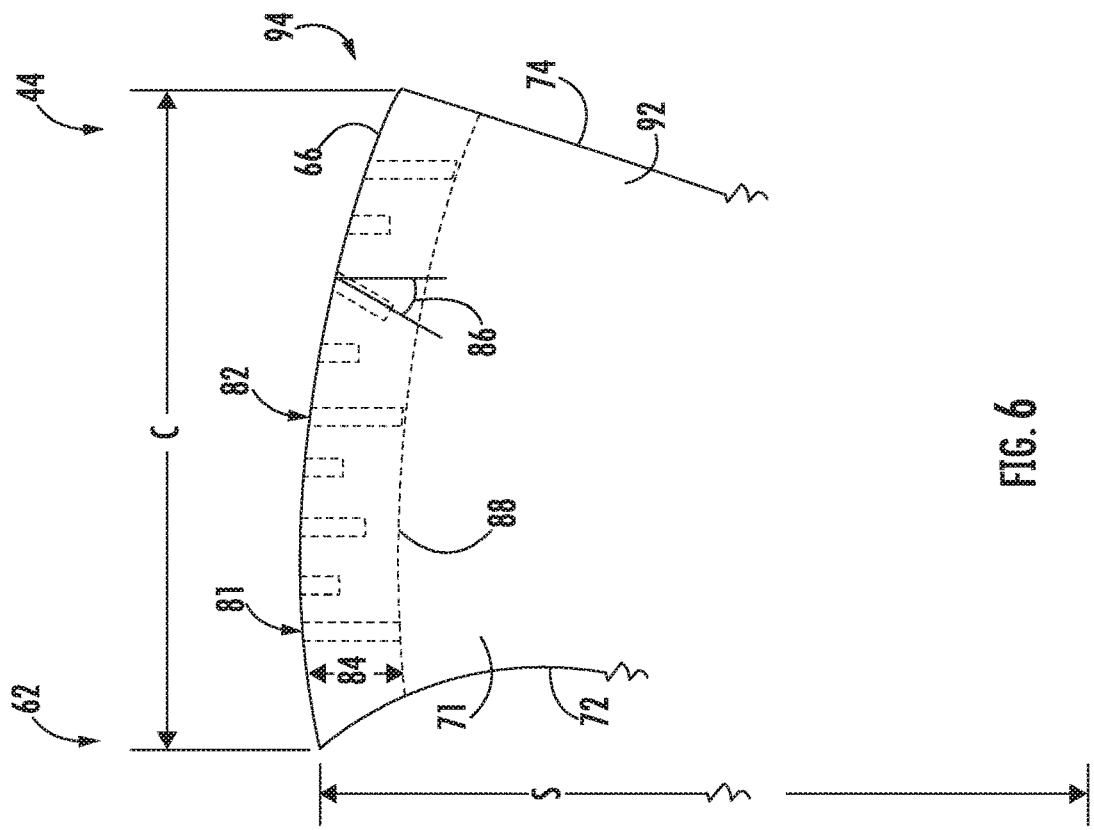
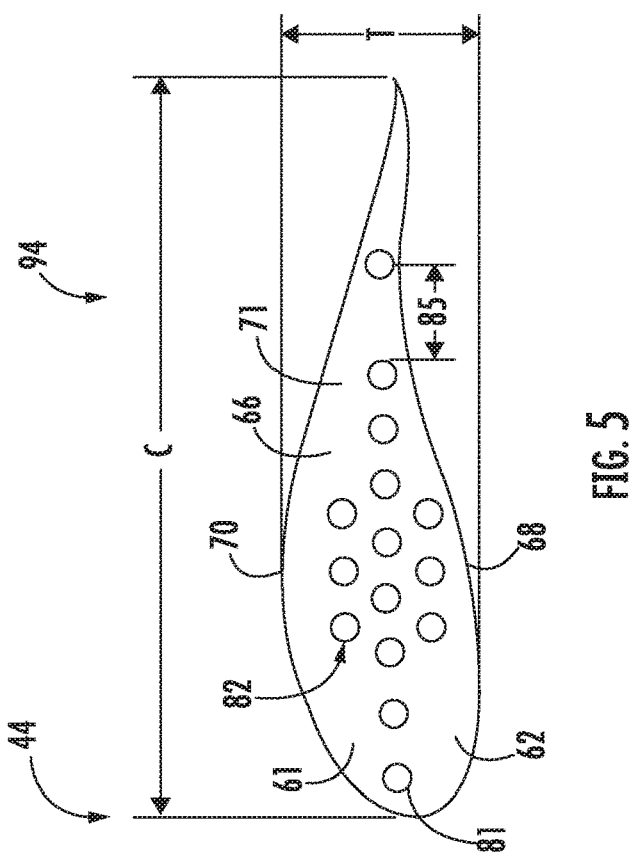

FRANGIBLE GAS TURBINE ENGINE AIRFOIL WITH FUSION CAVITIES

FIELD

The present subject matter relates generally to airfoils, and more particularly, to frangible airfoils for gas turbine engines with fusion cavities.

BACKGROUND

Airfoils used in aircraft engines, such as fan blades of a gas turbine engine, can be susceptible to extreme loading events. For instance, a fan blade might strike a bird that is ingested into the engine, or a blade-out occurrence may arise wherein one of the fan blades is severed from a rotor disk. If the impact is large enough, a fan blade may break apart into one or more shards before traveling downstream through the engine.

Gas turbine engines, such as turbofans, generally include fan cases surrounding a fan assembly including the fan blades. The fan cases are generally configured to withstand an impact of the fan blades due to adverse engine conditions resulting in a failure mode, such as foreign object damage, hard rubs due to excessive or extreme unbalance or fan rotor oscillations, or fan blade liberation. However, such airfoil configurations generally increase the weight of the fan case, thereby increasing the weight of the engine and aircraft and reducing performance and efficiency.

Known fan cases generally include frangible structures, such as honeycombs or trench-filler material, configured to mitigate load transfer to and through the fan case. However, this approach is generally costly. Furthermore, this approach may result in larger, heavier, less efficient fan cases. Still further, this approach may not address issues relating to fan rotor unbalance following deformation or liberation of one or several airfoils such as fan blades.

As such, there is a need for an airfoil that enables a controlled and consistent failure mode of the airfoil that may enable reducing a cost, weight, and load transfer to a surrounding casing.

BRIEF DESCRIPTION

Aspects and advantages will be set forth in part in the following description, or may be obvious from the description, or may be learned through practice of the invention.

In one aspect, the present subject matter is directed to an airfoil defining a span extending between a root and a tip and a chord at each point along the span extending between a leading edge and a trailing edge. The airfoil includes a frangible airfoil portion at the tip extending between the leading edge and the trailing edge and extending between the tip and a frangible line along the span. The frangible airfoil portion includes an exterior surface. The exterior surface at least partially defines at least one fusion cavity at least partially defining the frangible line. The airfoil further includes a residual airfoil portion extending from the frangible line to the root along the span. The residual airfoil portion meets the frangible airfoil portion at the frangible line.

In one embodiment, the airfoil may be formed at least in part from a composite material. In a further embodiment, the airfoil may be a fan blade of a gas turbine engine. In one exemplary embodiment, the at least one fusion cavity may include at least one fusion hole extending from the tip at least partially along the span to the frangible line. In another embodiment the at least one fusion hole may include a plurality of fusion holes. In such an embodiment, at least one of the plurality of fusion holes may extend between the tip and the frangible line. In another embodiment, the plurality of fusion holes may each extend between the tip and the frangible line. In one particular embodiment, the at least one fusion hole may extend along at least 5% of the span but less than 25% of the span.

In a further embodiment, the at least one fusion hole may extend parallel to the span. In another embodiment, the at least one fusion hole may extend at least partially along the chord. In a still further embodiment, the airfoil may further define a pressure side and a suction side. In such an embodiment, the at least one fusion hole may extend at least partially toward one of the pressure or suction side. In a still further embodiment, the at least one fusion hole may extend at least partially along the chord and at least partially toward one of the pressure or suction side.

In another exemplary embodiment, the at least one fusion cavity may include a plurality of fusion channels. Further, at least one fusion channel may extend at least partially along the frangible line. In such an embodiment, the at least one fusion channel may extend along the chord at a point along the span at least 10% but less than 50% of the span from the tip. In a further embodiment, the at least one fusion channel may extend along a full length of the frangible line. In other embodiments, the at least one fusion channel may extend along at least 10% of the chord at a point along the span S of the frangible line but less than the full chord at the point along the span of the frangible line.

In another embodiment, the at least one fusion channel may include a first fusion channel extending at least partially along the frangible line. In such an embodiment, the plurality of fusion channels may include a second fusion channel extending along the exterior surface of the frangible airfoil portion. In such an embodiment, the second fusion channel may extend at least partially along the frangible line. In another embodiment, the second fusion channel may extend at least partially along the chord at a point along the span between the frangible line and the tip.

In a further exemplary embodiment, the at least one fusion cavity may include a fusion channel extending from the tip to the frangible line. In such an embodiment, the airfoil may further define thickness extending between a pressure side and a suction side. The at least one fusion channel may define a thickness reduction of at least 10% of the thickness but less than 80% of the thickness. In one embodiment, the at least one fusion channel may define a variable thickness reduction.

In another embodiment, at least one of the frangible airfoil portion or the residual airfoil portion may include a first material defining a first modulus of elasticity. In such an embodiment, the airfoil may further include a filler material positioned within the at least one fusion cavity and at least partially filling the fusion cavity. The filler material may include a second modulus of elasticity less than the first modulus of elasticity.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 5 illustrates one embodiment of the fan blade in accordance with aspects of the present subject matter, particularly illustrating a plurality of fusion holes at an airfoil tip of the fan blade;

FIG. 6 illustrates another embodiment of the fan blade in accordance with aspects of the present subject matter, particularly illustrating a frangible airfoil portion of the fan blade of FIG. 4;

Figure 1:
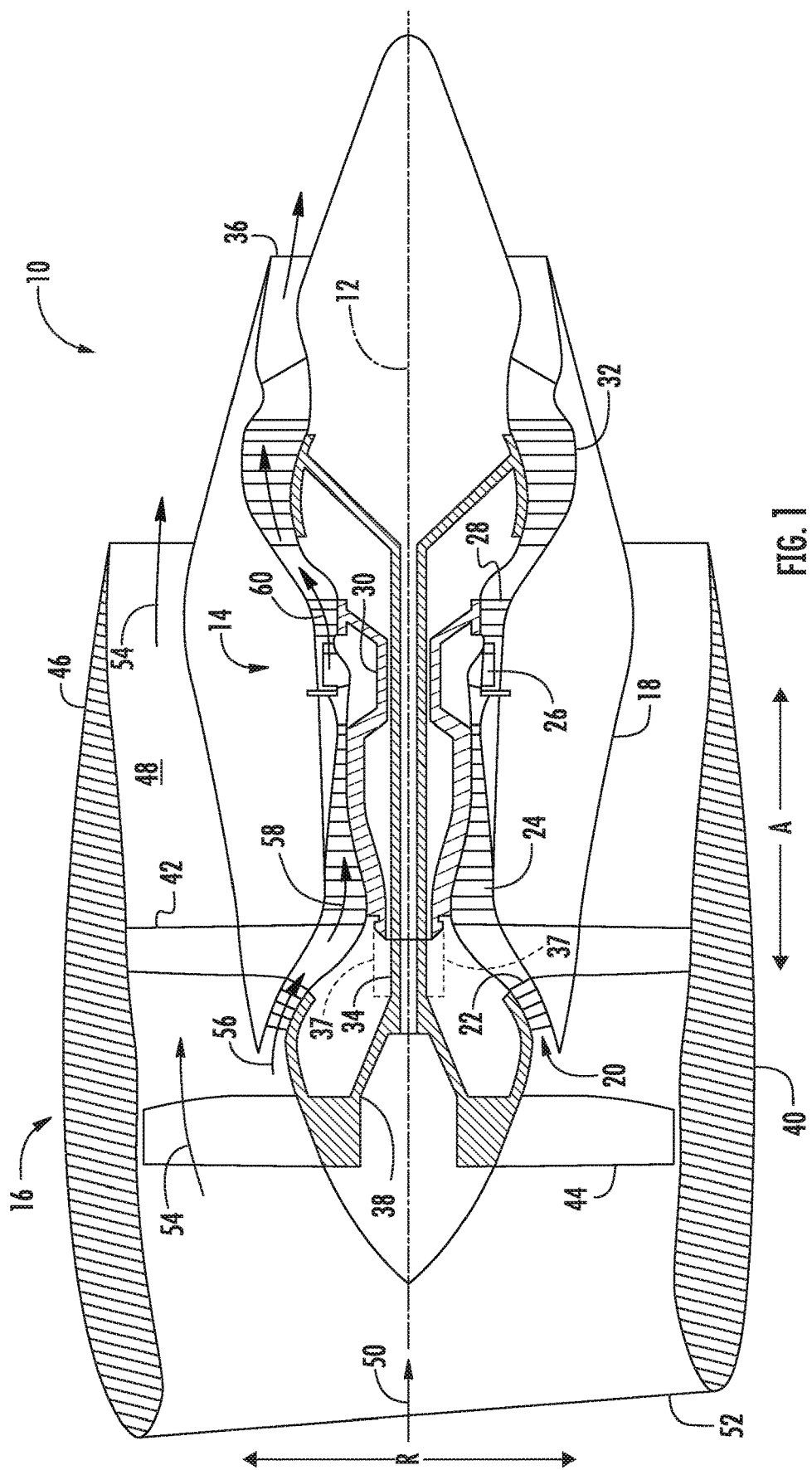
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A frangible airfoil for gas turbine engines is generally provided. The airfoil may include one or more fusion cavities on an exterior surface of a frangible airfoil portion of the airfoil. The frangible airfoil portion may extend between a leading edge and a trailing edge and from an airfoil tip to a frangible line along a span of the airfoil. The fusion cavities may include fusion holes and/or fusion channels. The airfoil may include a residual airfoil portion extending between the frangible line and an airfoil root along the span. The frangible airfoil portion positioned radially outward from the frangible line may include a reduced bending stiffness such that the frangible airfoil portion may break-off or bend during a failure mode of the airfoil. For example, the embodiments generally shown and described herein may enable a controlled and consistent failure of the airfoil, such as a fan blade, following a failure event, such as a hard rub against a surrounding fan case. The embodiments generally described herein enable the airfoil to deform or detach at a desired span of the airfoil to mitigate load transfer to a surrounding casing. The embodiments generally provided herein may further enable the airfoil to deform or detach such that excessive or extreme unbalance of the fan rotor may be reduced following a failure event, such as airfoil liberation, foreign object damage (e.g., bird strikes, icing, etc.), or loss of lube or damper to a bearing assembly.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extended from the centerline 12. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products may be expelled from the core engine 14 via an exhaust nozzle 36 to provide propulsive jet thrust.

Figure 2:
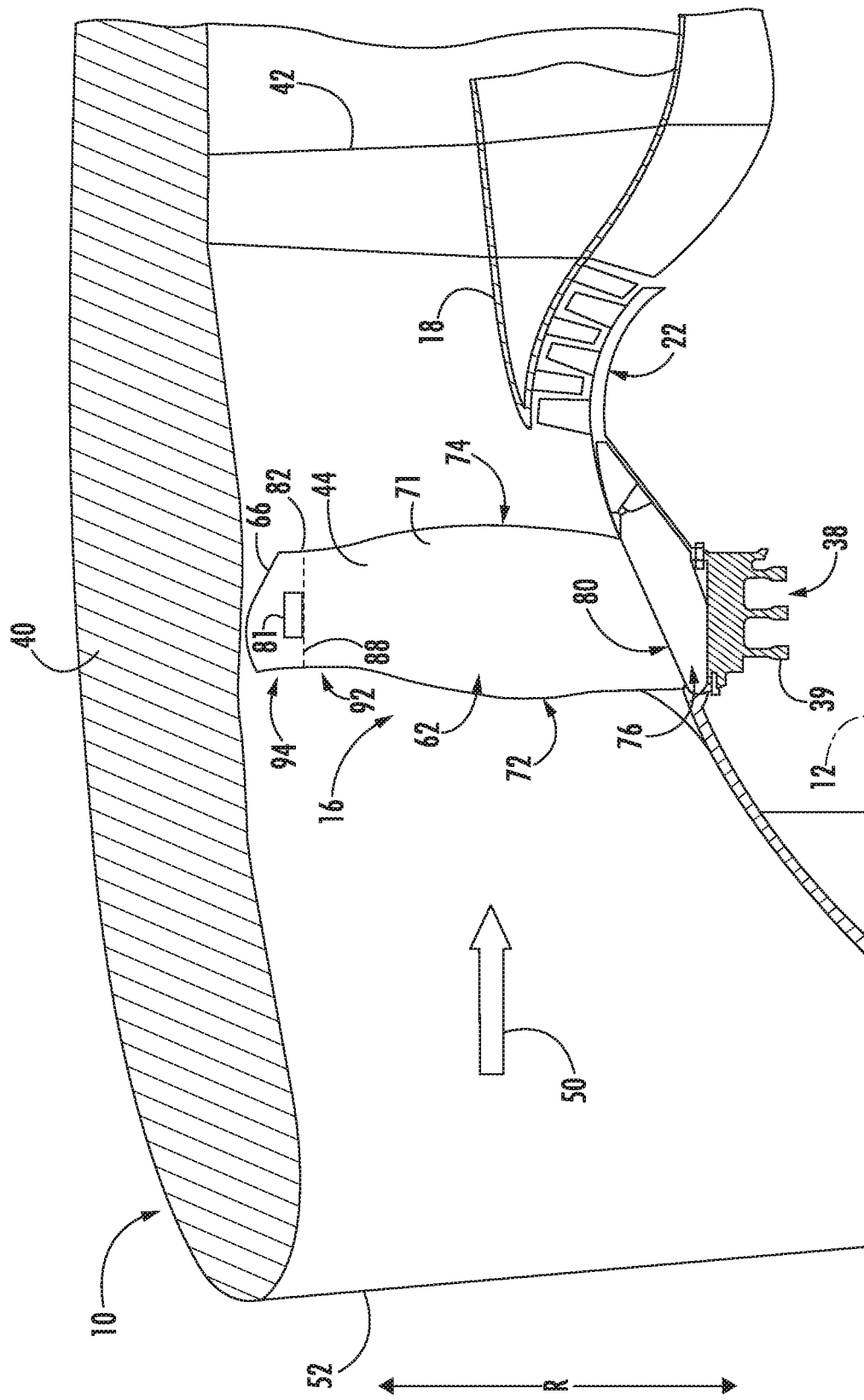
FIG. 2 illustrates a cross-sectional view of the fan section of FIG. 1 in accordance with aspects of the present subject matter, particularly illustrating a fan blade of the fan section.

Additionally, as shown in FIGS. 1 and 2, the fan section 16 of the gas turbine engine 10 generally includes a rotatable, axial-flow fan rotor 38 that configured to be surrounded by an annular fan casing 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 3:
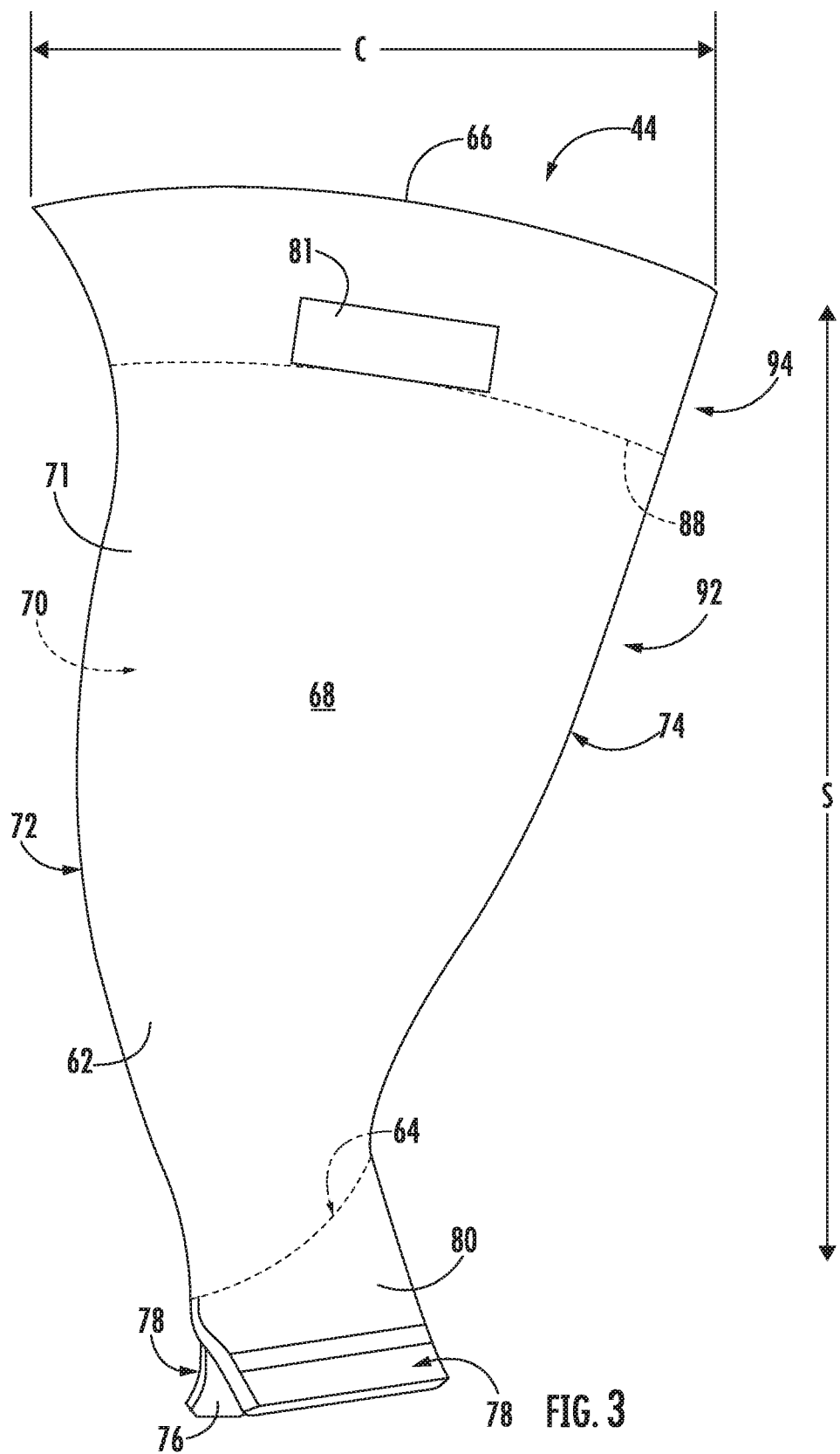
FIG. 3 illustrates a fan blade of the fan section of FIGS. 1 and 2 in accordance with aspects of the present subject matter, particularly illustrating a fusion cavity.

Referring to FIGS. 2 and 3, exemplary airfoil 62 embodiments are provided in the context of a fan blade 44. Although the illustrated airfoils 62 are shown as part of a fan blade 44, it is understood that the following discussion of an airfoil 62 may be equally applied to another airfoil embodiment, e.g., a stator vane or rotor blade of a compressor 22, 24 and/or turbine 28, 32 (see FIG. 1). As shown, each fan blade 44 extends radially outwardly along a span S from an airfoil root 64 to an airfoil tip 66. A pressure side 68 and a suction side 70 of the airfoil 62 extend from the airfoil's leading edge 72 to a trailing edge 74 and between the airfoil root 64 and airfoil tip 66 along the span S. Further, the airfoil 62 may include an exterior surface 71. For instance, the pressure and suction sides 68, 70 as well as the airfoil tip 66 may define the exterior surface 71 of the airfoil 62. It should be recognized that airfoil 62 may define a chord C at each point along the span S between the airfoil root 64 and the airfoil tip 66. Further, the chord C may vary along the span of the airfoil 62. For instance, in the depicted embodiment, the chord C increases along the span S toward the airfoil tip 66. Though, in other embodiments, the chord C may be approximately constant throughout the span S or may decrease from the airfoil root 64 to the airfoil tip 66.

Optionally, each fan blade 44 includes an integral component having an axial dovetail 76 with a pair of opposed pressure faces 78 leading to a transition section 80. When mounted within the gas turbine engine 10, as illustrated in FIG. 2, the dovetail 76 is disposed in a dovetail slot of the fan rotor disk 39, thereby attaching the fan blades 44 to the fan rotor 38.

The airfoil 62 may include at least one fusion cavity 81 defined at least partially on the exterior surface 71 of the airfoil 62. The at least one fusion cavity 81 may at least partially define a frangible line 88 of the airfoil 62. For instance, a portion of the fusion cavity 81 closest to the airfoil root 64 along the span S may define the frangible line 88. Further, the frangible line 88 may generally extend along the chord C toward the trailing edge 74. It should be recognized that the frangible line 88 may generally extend along the chord C at approximately the same point along the span S. In other embodiments, the frangible line 88 may at least partially extend radially inward or outward (e.g., along the span S) as the frangible line 88 extends axially along the chord C toward the trailing edge 74. In one embodiment, the airfoil 62 may define a residual airfoil portion 92 extending from the airfoil root 64 to the frangible line 88 along the span S of the airfoil 62. In such an embodiment, the airfoil 62 may further define a frangible airfoil portion 94 at the airfoil tip 66 extending between the leading edge 72 and the trailing edge 74 and extending between the airfoil tip 66 and the frangible line 88 along the span S. The frangible airfoil portion 94 may meet the residual airfoil portion 92 at the frangible line 88. The frangible airfoil portion 94 may have a reduced overall bending stiffness compared to the residual airfoil portion 92, as described in more detail below in regards to FIGS. 4-11. More particularly, FIGS. 4-7 illustrate embodiments of the airfoil 62 where the at least one fusion cavity 81 is configured as at least one fusion hole 82. FIGS. 8-11 illustrate embodiments of the airfoil 62 where the at least one fusion cavity 81 is configured as at least one fusion channel 100.

Referring particularly to the exemplary airfoil 62 of FIG. 3, the airfoil 62 may be configured to fracture, break, or liberate at approximately the frangible line 88 up to the airfoil tip 66 (e.g., the frangible airfoil portion 94) following a loading or impact upon the airfoil 62. For example, the airfoil 62 configured as the fan blade 44 within the fan casing 40 or nacelle of the gas turbine engine 10 (FIG. 1) may be configured to detach, decouple, deform, break, or liberate the frangible airfoil portion 94 of the airfoil 62 above the frangible line 88. In one non-limiting example, the frangible airfoil portion 94 of the airfoil 62 may be defined as the difference in spanwise dimensions of the frangible airfoil portion 94 and the residual airfoil portion 92. For example, the frangible airfoil portion 94 may be defined within approximately 3% to approximately 15% of the total span S from the airfoil tip 66.

During operation of the gas turbine engine 10, such as following an event generating substantial imbalance in the fan rotor 38 or LP shaft 34, the frangible airfoil portion 94, e.g., of the fan blade 44, as shown and described in various embodiments in FIGS. 4-11 may be configured to deform or partially or fully detach from the remainder of the airfoil 62, e.g., along the frangible line 88. Further, the frangible airfoil portion 94 may detach (e.g., along the frangible line 88) while leaving all of or at least a portion of the residual airfoil portion 92. Events generating substantial unbalance in the fan rotor 38 and/or LP shaft 34 may include, but are not limited to, foreign object damage (e.g., bird strikes, ice ingestion, other debris, etc.) or fan blade 44 detachment. Detaching or decoupling the frangible airfoil portion 94 may reduce undesired unbalance or vibrations as the fan rotor 38 and/or LP shaft 34 continue to rotate. Furthermore, the embodiments of the airfoil 62 generally shown and described in regards to FIGS. 4-11 may enable a lighter fan casing 40 or nacelle, such as reducing an amount of metal materials or abradable material of the fan casing 40 or nacelle.

Figure 4:
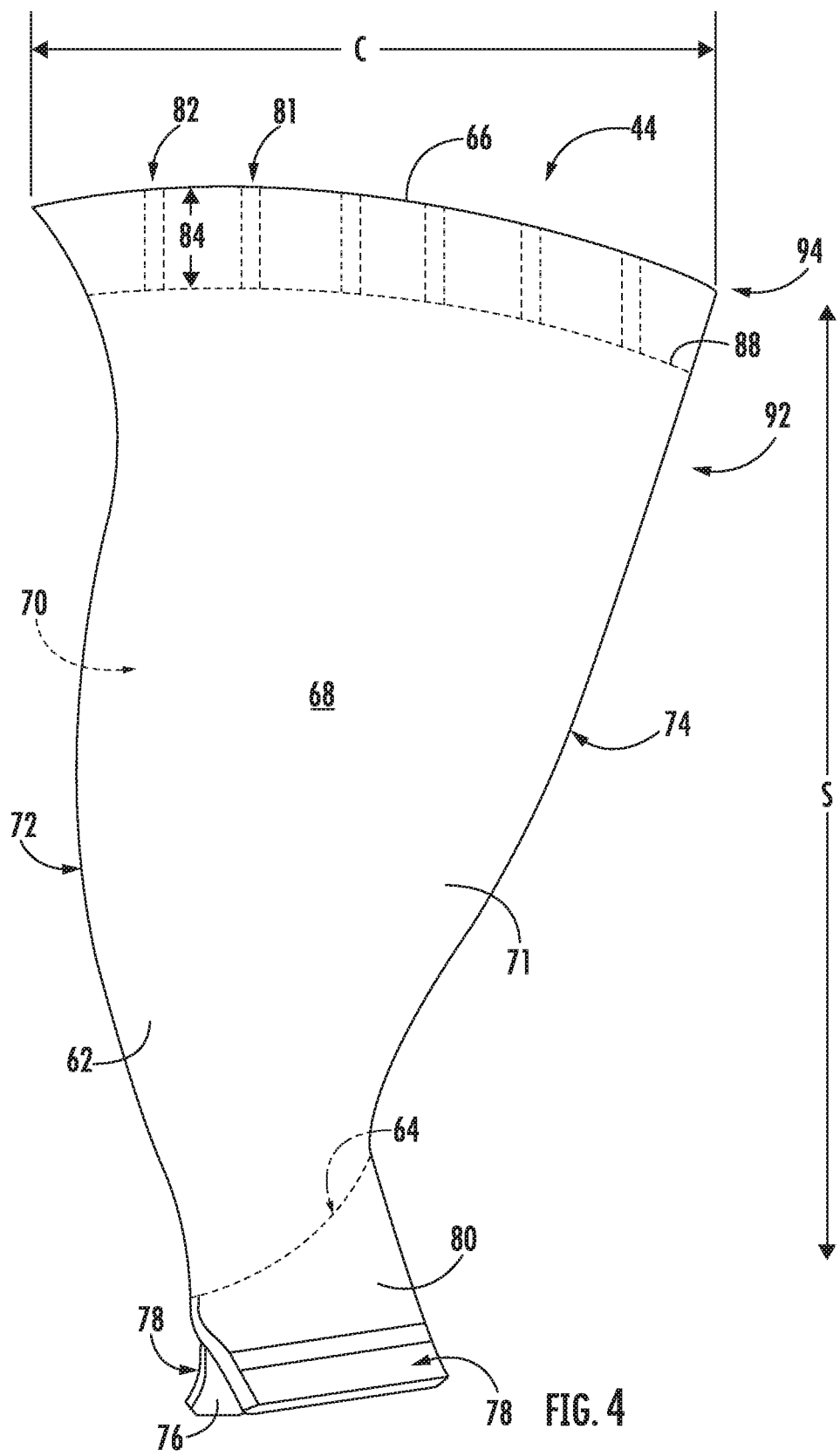
FIG. 4 illustrates one embodiment of a fan blade of FIG. 3 in accordance with aspects of the present disclosure, particularly illustrating a fan blade where the fusion cavity is configured as a fusion hole.

Referring now to FIG. 4, one embodiment of a fan blade 44 is illustrated in accordance with aspects of the present disclosure. Particularly, FIG. 4 illustrates a fan blade 44 where the at least one fusion cavity 81 is configured as at least one fusion hole 82. The airfoil 62 may include the at least one fusion hole 82 extending from the airfoil tip 66 at least partially along the span S toward the airfoil root 64. More particularly, the fusion hole 82 may extend to the frangible line 88. As illustrated, in one embodiment, the airfoil 62 may include a plurality of fusion holes 82. In such an embodiment, at least one of the plurality of fusion holes 82 may extend between the airfoil tip 66 and the frangible line 88 as described in more detail below.

As further illustrated in FIG. 4, the frangible airfoil portion 94 is depicted with the fusion hole(s) 82 extending between the airfoil tip 66 and the frangible line 88. For instance, a plurality of fusion holes 82 may be positioned generally along the chord C at the airfoil tip 66. The fusion hole(s) 82 may define a depth 84 extending from the airfoil tip 66 along the span S. Further, the depth 84 of at least one fusion hole 82 may extend from the airfoil tip 66 to the frangible line 88. In certain embodiments, the depth 84 the fusion hole(s) 82 may extend along at least 5% of the span S but less than 25% of the span S. In other embodiments, the depth 84 of the fusion hole(s) 82 may extend along at least 10% of the span S but less than 20% of the span S. In certain embodiments, each fusion hole 82 of a plurality of fusion holes 82 may extend along a depth 84 of approximately the same percentage of the span S. For instance, each fusion hole 82 may extend to the frangible line 88 at approximately a constant percentage of the span S between the leading edge 72 and the trailing edge 74. In such embodiments, it should be recognize that the frangible airfoil portion 94 may also extend along the depth 84 between the airfoil tip 66 and the frangible line 88. Or more particularly, the fusion hole(s) 82 may define the frangible airfoil portion 94 such that a height of the frangible airfoil portion 94 (e.g., the distance between the airfoil tip 66 and the frangible line 88 along the span S) is the same as or approximately the same as the depth 84.

In certain embodiments, the residual airfoil portion 92 may define a portion of the airfoil 62 with a first overall bending stiffness. Similarly, the fusion hole(s) 82 may define a portion of the airfoil 62 with a second overall bending stiffness (e.g., the frangible airfoil portion 94) less than the first overall bending stiffness of the residual airfoil portion 92. For instance, the fusion hole(s) 82 may reduce an amount of the airfoil 62 above the frangible line 88 along the span S and the chord C. As such, the frangible airfoil portion 94 may have a reduced stiffness allowing the frangible airfoil portion 94 to fracture, break, liberate, decouple, deform, deflect, etc. at the frangible line 88 as described above. It should be recognized that the residual airfoil portion 92 may be substantially free of holes or voids. For instance, the first overall bending stiffness may be approximately the bending stiffness of the material(s) forming the residual airfoil portion 92 and/or the airfoil 62.

Referring now to FIG. 5, a top view of one embodiment of the airfoil 62 is illustrated in accordance with aspects of the present subject matter. Particularly, FIG. 5 illustrates the plurality of fusion holes 82 at the airfoil tip 66. As illustrated, it should be recognized that the fusion holes 82 are defined at least partially through the exterior surface 71 at the airfoil tip 66. As shown, the airfoil 62 may define a thickness T between the pressure side 68 and the suction side 70. Further, it should be recognized the thickness T may be variable along the chord C. The airfoil 62 may define one or more gaps 85 between adjacent fusion holes 82. For instance, in certain embodiments, the gap(s) 85 may be oriented approximately along the chord C at the airfoil tip 66. Further, in such embodiments, the fusion holes 82 may be equally spaced apart at the airfoil tip 66 with approximately equal gaps 85 along the chord C (see, e.g., FIG. 3). In other embodiments, the fusion holes 82 may define variable gaps 85 along the chord C between fusion holes 82. For instance, the gaps 85 may be smaller, and thus the fusion holes 82 closer together, where the thickness T of the airfoil 62 is at or near a maximum value. Further, the gaps 85 may be larger where the thickness T of the airfoil 62 is less than the maximum value. It should be recognized that thicker portions of the airfoil 62 may require more fusion holes 82 to reduce the bending stiffness sufficiently to create the frangible airfoil portion 94. For instance, fusion holes 82 arranged more tightly together may reduce the bending stiffness at that location to a greater degree compared to fusion holes 82 arranged more spread out. Further, it should be recognized that adjacent fusion holes 82 may also be spaced apart toward the pressure or suction sides 68, 70 of the airfoil 62. For example, one or more of the gaps 85 may be oriented at least partially toward pressure or suction sides 68, 70.

Referring now to FIG. 6, another embodiment of the airfoil 62 is illustrated in accordance with aspects of the present subject matter. Particularly, FIG. 6 illustrates the frangible airfoil portion 94 of the airfoil 62. As described briefly in regards to FIG. 4, in certain embodiments, each of the plurality of fusion holes 82 may extend between the airfoil tip 66 and the frangible line 88. As such, the each fusion hole 82 may reduce the bending stiffness approximately equally throughout the frangible airfoil portion 94. In other embodiments, one or more of the fusion holes 82 may extend between the airfoil tip 66 and the frangible line 88 while one or more of the fusion holes 82 may extend only partially between the airfoil tip 66 and the frangible line 88. For instance, the depth 84 of some of the fusion holes 82 may not extend the full height of the frangible airfoil portion 94.

It should be recognized that the more fusion holes 82 that extend to a specific span-wise location the more the bending stiffness of the frangible airfoil portion 94 at that span-wise location may be reduced. Further, in certain embodiments, the number of fusion holes 82 may increase at each point along the span S from the frangible line 88 to the airfoil tip 66. For example, the number of fusion holes 82 that extend to any specific depth 84 may increase toward the airfoil tip 66. As such, the bending stiffness of the frangible airfoil portion 94 may decrease from the frangible line 88 to the airfoil tip 66. It should be recognized that, in such an embodiment, the frangible airfoil portion 94 may be more easily deflected and/or detached toward the airfoil tip 66 and more difficult to deflect and/or detach toward the frangible line 88.

Still referring to the illustrated embodiment of FIG. 6, one or more fusion holes 82 may extend parallel to the span S. In other embodiments, at least one fusion hole 82 may extend at least partially along the chord C. For instance, the fusion hole(s) 82 may define a chordwise angle 86 offset from the span S of the airfoil 62. Further, it should be recognized that two or more fusion holes 82 may define approximately equal chordwise angles 86. In other embodiments, two or more fusion holes 82 may define different chordwise angles 86, such as a first fusion hole with a first chordwise angle greater than a second chordwise angle of a second fusion hole. In another an embodiment, the fusion hole(s) 82 may extend at least partially toward one of the pressure or suction sides 68, 70. For example, the fusion hole(s) 82 may define a circumference-wise angle (not shown) offset from the span S of the airfoil 62 toward one of the pressure or suction sides 68, 70. As such, in certain embodiments, one or more fusion holes 82 may define a spanwise component, a chordwise component, a circumferential component, or any combination of the three.

Figure 7:
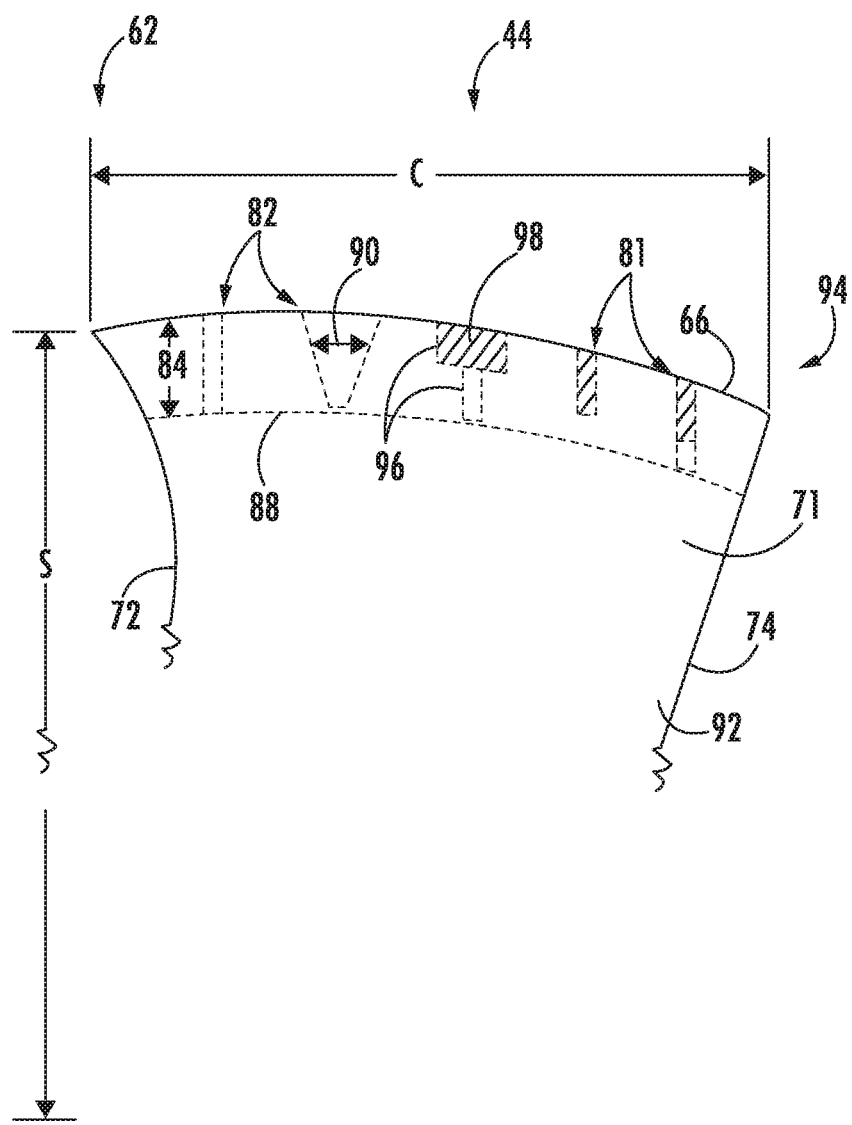
FIG. 7 illustrates another embodiment of the frangible airfoil portion of FIG. 4 in accordance with aspects of the present subject matter, particularly illustrating a fusion hole with a variable diameter.

Referring now to FIG. 7, another embodiment of the frangible airfoil portion 94 is illustrated in accordance with aspect of the present subject matter. Particularly, FIG. 7 illustrates the frangible airfoil portion 94 including fusion holes 82 with a variable diameter. For instance, each fusion hole 82 may define a diameter 90. In certain embodiments, the airfoil 62 may define the fusion hole(s) 82 with a constant diameter 90 between the frangible line 88 and the airfoil tip 66. In other embodiments, as illustrated, the airfoil 62 may define one or more fusion holes 82 with a variable diameter 90 between the frangible line 88 and the airfoil tip 66. For instance, the diameter 90 of the fusion hole(s) 82 may increase from the frangible line 88 to the airfoil tip 66. Particularly, certain fusion holes 82 may define a diameter 90 that increases gradually between the frangible line 88 and the airfoil tip 66.

Other fusion holes 82 may define discrete portions 96 along the depth 84 defining discrete diameters 90. Further, the discrete diameters 90 of the discrete portions 96 may increase along the span S between the frangible line 88 and the airfoil tip 66. For instance, one or more fusion holes 82 may be counterbored. In other embodiments, one or more discrete portions 96 may define a variable diameter 90 along the span S (e.g., a countersink). Moreover, in certain embodiments, the bending stiffness of the frangible airfoil portion 94 may also decrease between the frangible line 88 and the airfoil tip 66. More particularly, removing more material from the frangible airfoil portion 94 toward the airfoil tip 66 may reduce the bending stiffness toward the airfoil tip 66 compared to the bending stiffness proximate to the frangible line 88.

Figure 8:
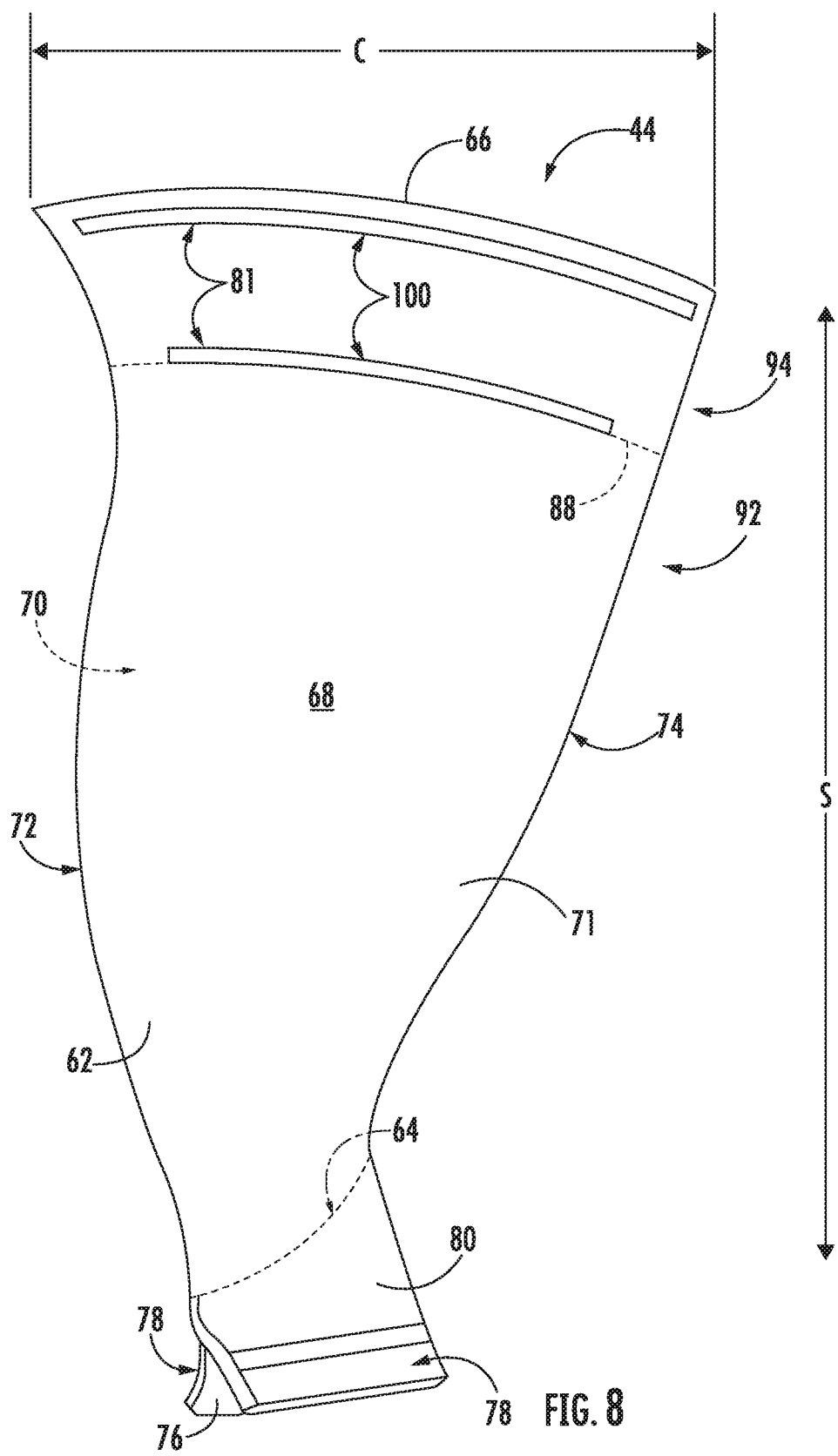
FIG. 8 illustrates another embodiment of a fan blade of FIG. 3 in accordance with aspects of the present disclosure, particularly illustrating a fan blade where the fusion cavity is configured as a fusion channel.

Referring now to FIG. 8, another embodiment of the fan blade 44 is illustrated in accordance with aspects of the present disclosure. Particularly, FIG. 8 illustrates a fan blade 44 where the at least one fusion cavity 81 is configured as at least on fusion channel 100. More particularly, the at least one fusion cavity 82 may include a plurality of fusion channels 100. As shown, one or more fusion channels 100 may extend at least partially along the frangible line 88. For instance, the fusion channel 100 may be defined on the exterior surface 71 of the airfoil 62 at the frangible line 88. The fusion channel 100 may at least partially extend along the chord C at a point along the span S of the frangible line 88. As such, it should be recognized that the fusion channel 100 may at least partially define the point along the span of the frangible line 88. Further, in certain embodiments, the fusion channel 100 may extend along approximately the same point along the span S (e.g., along the chord C at one point along the span).

In one embodiment, the fusion channel 100 may extend along a full length of the frangible line 88. For instance, in such an embodiment, the fusion channel 100 may extend along the full chord C at the point along the span S of the frangible line 88. More particularly, the fusion channel 100 may define the frangible line 88 at such a point along the span S extending along the chord C. In other embodiments, the at least one fusion channel 100 may extend along at least 10% of the chord C at the point along the span S of the frangible line 88 but less than the full chord C at the point along the span of the frangible line 88. In one particular embodiment, the fusion channel 100 may extend along at least 40% of the chord C at the point along the span S of the frangible line 88 but less than 70% of the chord C at the point along the span S of the frangible line 88. It should be appreciated that the fusion channel 100 may extend along any portion of the chord C such that the fusion channel 100 reduces the bending stiffness of the frangible airfoil portion 94. As further illustrated in FIG. 8, frangible airfoil portion 94 may include one or more additional fusion channels 100 extending along the exterior surface 71 of the frangible airfoil portion 94. For instance, the additional fusion channel 100 may extend on the same side (e.g., the pressure side 68) or the opposite side of the fusion channel 100 extending along the frangible line 88 (see, e.g., FIGS. 9 and 10).

Figure 9:
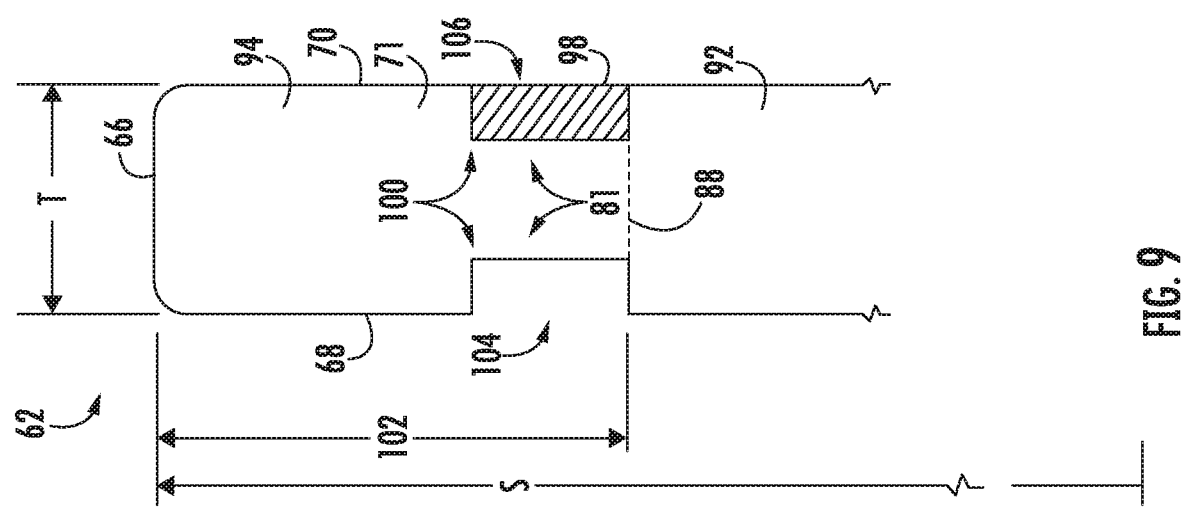
FIG. 9 illustrates one embodiment of the fan blade of FIG. 8 in accordance with aspects of the present subject matter, particularly illustrating a cross-section of frangible airfoil portion of the fan blade.

Referring now to FIG. 9, another embodiment of the frangible airfoil portion 94 is illustrated in accordance with aspects of the present subject matter. Particularly, FIG. 9 illustrates a cross-section of an airfoil 62 including fusion cavities 81 configured as fusion channels 100. In such an embodiment, the fusion channel(s) 100 may extend along the chord C at a point along the span S at least 10% of the span S from the airfoil tip 66, such as at least 15% of the span S from the airfoil tip 66. More particularly, the fusion channel(s) 100 may define a channel height 102 of each fusion channel 100 from the airfoil tip 66 to a radially innermost position of the fusion channel 100 (e.g., the position of the fusion channel 100 nearest the airfoil root 64 along the span S). Further, the channel height 102 may be at least 10% of the span S from the airfoil tip 66 to the frangible line 88 (e.g., along a plane defined by the frangible line 88 between the leading edge 72, the trailing edge 74, the pressure side 68, and/or the suction side 70). In certain embodiments, the channel height 102 may be at least 15% of the span S from the airfoil tip 66 along the frangible line 88 but less than 50% of the span S.

In such embodiments, it should be recognize that the frangible airfoil portion 94 may also extend along the channel height 102 between the airfoil tip 66 and the frangible line 88. Or more particularly, the fusion channel(s) 100 may define the frangible airfoil portion 94 such that a height of the frangible airfoil portion 94 (e.g., the distance between the airfoil tip 66 and the frangible line 88 along the span S) is the same as or approximately the same as the channel height 102. The fusion channels 100 may define a portion of the airfoil 62 with a second overall bending stiffness (e.g., the frangible airfoil portion 94) less than the first overall bending stiffness of the residual airfoil portion 92. For instance, the fusion channel(s) 100 may reduce an amount of the airfoil 62 at or above the frangible line 88 along the span S and the chord C. As such, the frangible airfoil portion 94 may have a reduced stiffness allowing the frangible airfoil portion 94 to fracture, break, liberate, decouple, deform, deflect, etc. at the frangible line 88 as described above.

As further illustrated in FIG. 9, the at least one fusion channel 100 may include a first fusion channel 104 extending at least partially along the frangible line 88. In such an embodiment, the plurality of fusion channels 100 may include a second fusion channel 106 extending along the exterior surface 71 of the frangible airfoil portion 94. In such an embodiment, the second fusion channel 106 may extend at least partially along the frangible line 88. For example, the first fusion channel 104 may at least partially extend along the frangible line 88 on one of the pressure or suctions side 68, 70, and the second channel 106 may at least partially extend along the frangible line 88 on the other of the pressure or suction side 68, 70. For instance, both the first and second channels 104, 106 may extend along the full frangible line 88 on opposite sides 68, 70 of the airfoil 62.

Figure 10:
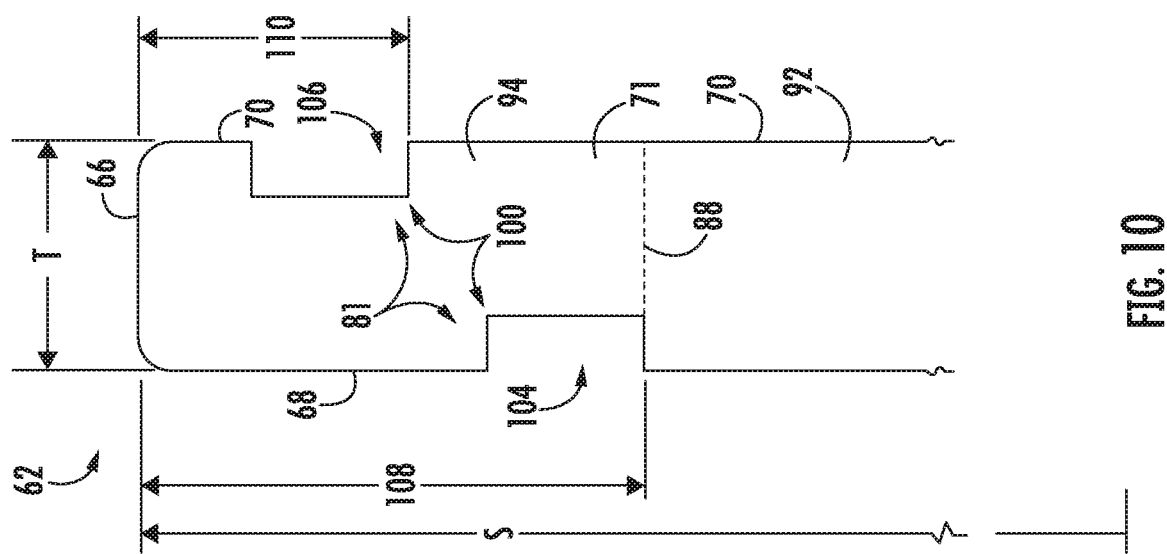
FIG. 10 illustrates another embodiment of the fan blade of FIG. 8 in accordance with aspects of the present subject matter, particularly illustrating a cross-section of the frangible airfoil portion of the fan blade with fusion channels at different points along the span.

Referring now to FIG. 10, another embodiment of the frangible airfoil portion 94 is illustrated in accordance with aspects of the present subject matter. Particularly, FIG. 10 illustrates a cross-section of an airfoil 62 including fusion channels 100 at different point along the span S. For example, the second fusion channel 106 may extend at least partially along the chord C at a point along the span S between the frangible line 88 and the airfoil tip 66. For instance, the second fusion channel 106 may extend at least partially along the chord C at a point along the span S positioned toward the airfoil tip 66 relative to the first fusion channel 104. In such an embodiment, it should be recognized that the first fusion channel 104 may define a first channel height 108 greater than a second fusion channel height 110 defined by the second fusion channel 106. It should be appreciated that such a second fusion channel 106 may be positioned on the same side of the airfoil 62 (i.e., the pressure side 68 or suction side 70), or, in other embodiments, the first and second fusion channels 104, 106 may be positioned on opposite sides 68, 70 of the airfoil 62.

It should also be recognized that the frangible airfoil portion 94 may define more than two fusion channels 100, such as three or more fusion channels 100. It should also be appreciated that fusion channels 100 positioned toward the airfoil tip 66 relative to the frangible line 88 may further reduce the second overall bending stiffness of the frangible airfoil portion 94. For instance, in certain embodiments, fusion channels 100 may be positioned between the frangible line 88 and the airfoil tip 66 to define an approximately constant second overall bending stiffness. In other embodiments, fusion channels 100 may be positioned closer together toward the airfoil tip 66. As such, the bending stiffness may be lower at the airfoil tip 66 than at the frangible line 88.

Figure 11:
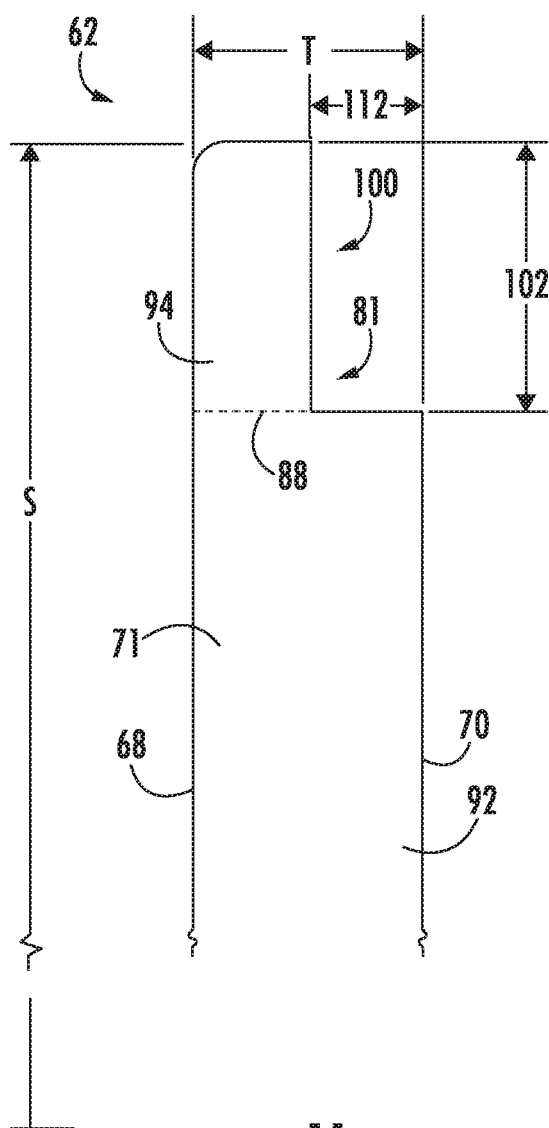
FIG. 11 illustrates another embodiment of the fan blade of FIG. 8 in accordance with aspects of the present subject matter, particularly illustrating a cross-section of the frangible airfoil portion with the fusion channel configured as a relief pocket.

Referring now to FIG. 11, another embodiment of the frangible airfoil portion 94 of the airfoil 62 is illustrated in accordance with aspects of the present subject matter. Particularly, FIG. 11 illustrates the fusion channel 100 configured as a as a relief pocket near the airfoil tip 66 on one of the pressure or suction side 68, 70. More particularly, in the illustrated embodiment, the fusion cavity 81 may be defined in the exterior surface 71 as a fusion channel 100 extending from the airfoil tip 66 to the frangible line 88. As such, the fusion channel 100 may be a relief pocket. Further, as depicted, the fusion channel 100 may be defined on the exterior surface 71 on the suction side 70 of the airfoil 62 (e.g., a suction side relief pocket). Moreover, by reducing the amount of the airfoil 62 near the airfoil tip 66, the relief pocket may reduce the second overall bending stiffness of the frangible airfoil portion 94. It should also be recognized that the fusion channel 100 of FIG. 11 may extend along the full chord C at the airfoil tip 66 and/or along the full chord C at each point along the span S between the airfoil tip 66 and the frangible line 88. In other configurations, the fusion channel 100 may partially extend along the chord C at the airfoil tip 66 and/or partially along the chord C at each point along the span between the airfoil tip 66 and the frangible line 88. For instance, the fusion channel 100 may extend along the chord C at the airfoil tip 66 between 10% and 100% of the chord C.

As further illustrated in FIG. 11, the at fusion channel 100 may define a thickness reduction 112 of the thickness T. For instance, the fusion channel 100 may define a thickness reduction 112 of at least 10% of the thickness T but less than 80% of the thickness T. In one embodiment, the fusion channel 100 may define a constant thickness reduction 112. For example, the thickness reduction 112 may be the same percentage or approximately the same percentage of the thickness T along the chord C at each point along the span S within the fusion channel 100. In another embodiment, the fusion channel 100 may define a variable thickness reduction 112. For instance, the thickness reduction 112 may be at a maximum percentage of the thickness T at a chordwise and spanwise position of a maximum thickness T of the airfoil 62. For instance, a position of the maximum thickness T of the airfoil 62 may require more material removal from the airfoil 62 to sufficiently reduce the second overall bending stiffness.

Referring now to FIGS. 7 and 9, in one embodiment, at least one of the frangible airfoil portion 94 or the residual airfoil portion 92 may include a first material defining a first modulus of elasticity. In such an embodiment, the airfoil may further include a filler material 98 positioned within one or more fusion cavities 81 (e.g., the fusion hole(s) 82 and/or the fusion channel(s) 100) and at least partially filling the fusion cavity(ies) 81. In one particular embodiment, as illustrated in FIG. 7, one or more fusion holes 82 of a plurality of fusion holes 82 may include a respective filler material 98. In another embodiment, as illustrated in FIG. 9, one or more fusion channels 100 may include a respective filler material 98. In certain embodiments, the filler material(s) 98 may entirely fill the fusion cavity(ies) 81. In other embodiments, the filler material(s) 98 may only partially fill the fusion cavity(ies) 81. For example, the filler material 98 may partially fill a portion of the fusion hole 82 toward the airfoil tip 66. Further, it should be recognized that that the filler material(s) 98 may be flush with the exterior surface 71 of the airfoil 62. The filler material(s) 98 may include a second modulus of elasticity less than the first modulus of elasticity. As such, a frangible airfoil portion 94 including the filler material(s) 98 may still define a bending stiffness less than the bending stiffness defined by the residual airfoil portion 92.

Though the different configuration of the fusion cavities 81 have been illustrated in separate figures in the above description. It should be recognized that certain embodiments of the airfoil 62 may include a combination of different types of fusion cavities 81. For instance, one or more embodiments of the airfoil 62 may include a combination of one or more fusion holes 82 and fusion channels 100. Further, fusion holes 82 may also be used in combination with the relief pocket of FIG. 11 to reduce the second overall bending stiffness of the frangible airfoil portion 94.

In one embodiment, the airfoil 62, the frangible airfoil portion 94, and/or residual airfoil portion 92 may include at least one of a metal, metal alloy, or composite material. For instance, the airfoil 62 may be formed at least partially from a ceramic matrix composite. More particularly, in certain embodiments, the airfoil 62 may be formed from one or more ceramic matrix composite prepreg plies. In another embodiment, the airfoil 62 may be formed from a ceramic matrix composite woven structure (e.g., a 2D, 3D, or 2.5D woven structure). In still other embodiments, the airfoil 62 may be formed at least partially from a metal, such as but not limited to, steel, titanium, aluminum, nickel, or alloys of each. For instance, in certain embodiments, the airfoil 62 may be cast. Though, it should be recognized that the airfoil 62 may be formed from multiple materials, such as a combination of metals, metal alloys, and/or composites. For example, the residual airfoil portion 92 may include one material while the frangible airfoil portion 94 includes another material bonded with the residual airfoil portion 92 at the frangible line 88. It should be recognized that the materials forming the frangible airfoil portion 94 may have a reduced stiffness comparted to the materials forming the residual airfoil portion 92. Further, it should be recognized that the fusion cavity(ies) 81 may be formed in a completed airfoil 62 (e.g., cut, machined, bored, or drilled) or may be defined within the airfoil 62 while the airfoil 62 is formed (e.g, in a mold of a cast or defined in plies of a composite component). In general, the exemplary embodiments of the airfoil 62 described herein may be manufactured or formed using any suitable process.

Composite materials may include, but are not limited to, metal matrix composites (MMCs), polymer matrix composites (PMCs), or ceramic matrix composites (CMCs). Composite materials, such as may be utilized in the airfoil 62, generally comprise a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Similarly, in various embodiments, PMC materials may be fabricated by impregnating a fabric or unidirectional tape with a resin (prepreg), followed by curing. For example, multiple layers of prepreg may be stacked to the proper thickness and orientation for the part, and then the resin may be cured and solidified to render a fiber reinforced composite part. As another example, a die may be utilized to which the uncured layers of prepreg may be stacked to form at least a portion of the composite component. The die may be either a closed configuration (e.g., compression molding) or an open configuration that utilizes vacuum bag forming. For instance, in the open configuration, the die forms one side of the blade (e.g., the pressure side 68 or the suction side 70). The PMC material is placed inside of a bag and a vacuum is utilized to hold the PMC material against the die during curing. In still other embodiments, the airfoil 62 may be at least partially formed via resin transfer molding (RTM), light resin transfer molding (LRTM), vacuum assisted resin transfer molding (VARTM), a forming process (e.g. thermoforming), or similar.

Prior to impregnation, the fabric may be referred to as a "dry" fabric and typically comprises a stack of two or more fiber layers (plies). The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. Other embodiments may include other textile forms such as plane weave, twill, or satin.

In one embodiment, PMC materials can be produced by dispersing dry fibers into a mold, and then flowing matrix material around the reinforcement fibers. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

In general, the exemplary embodiments of the airfoil 62 described herein may be manufactured or formed using any suitable process. However, in accordance with several aspects of the present subject matter, the airfoil 62 may be formed using an additive-manufacturing process, such as a 3D printing process. The use of such a process may allow the airfoil 62 to be formed integrally, as a single monolithic component, or as any suitable number of sub-components. For example, at least one of the frangible airfoil portion 94 or the residual airfoil portion 92 may be formed using an additive-manufacturing process. In particular, at least one fusion cavity 81 (e.g., the fusion hole(s) 82 and/or the fusion channel(s) 100) may be formed in the frangible airfoil portion 94 via an additive-manufacturing process. Forming the fusion cavity(ies) 81 via additive manufacturing may allow the fusion cavity(ies) 81 to be integrally formed and include a variety of features not possible when using prior manufacturing methods. For example, the additive manufacturing methods described herein enable the manufacture of fusion cavity(ies) 81 having any suitable size and shape with one or more configurations, some of these novel features are described herein. Further, additive manufacturing may allow the airfoil 62 to be formed where the frangible airfoil portion 94 includes a material with a lower bending stiffness than a material used to form the residual airfoil portion 92.

As used herein, the terms "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the airfoil 62, the residual airfoil portion 92, the frangible airfoil portion 94, and/or internal or external passageways such as the fusion cavity(ies) 81, openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

While the present disclosure is not limited to the use of additive manufacturing to form these components generally, additive manufacturing does provide a variety of manufacturing advantages, including ease of manufacturing, reduced cost, greater accuracy, etc. In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above may enable much more complex and intricate shapes and contours of the airfoil 62 described herein. For example, such components may include thin additively manufactured layers and unique fluid passageways or cavities, such as the fusion cavity(ies) 81. In addition, the additive manufacturing process enables the manufacture of a single component having different materials such that different portions of the component may exhibit different performance characteristics. The successive, additive nature of the manufacturing process enables the construction of these novel features. As a result, the airfoil 62 described herein may exhibit improved performance and reliability.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil defining a span extending between a root and a tip and a chord at each point along the span extending between a leading edge and a trailing edge, the airfoil comprising:
    a frangible airfoil portion at the tip extending between the leading edge and the trailing edge and extending between the tip and a frangible line along the span, the frangible airfoil portion including an exterior surface, wherein the exterior surface at least partially defines at least one fusion cavity, with a portion of the at least one fusion cavity closest the root at least partially defining the frangible line; and
    a residual airfoil portion extending from the frangible line to the root along the span, wherein the residual airfoil portion meets the frangible airfoil portion at the frangible line, the frangible line defining a point of detachment of the frangible airfoil portion during a failure mode of the airfoil;
    wherein the at least one fusion cavity comprises at least one fusion hole extending from the tip at least partially along the span to the frangible line.

2. The airfoil of claim 1, wherein the airfoil is formed at least in part from a composite material.

3. The airfoil of claim 1, wherein the airfoil is a fan blade of a gas turbine engine.

4. The airfoil of claim 1, further comprising a filler material positioned within the at least one fusion cavity, at least partially filling the at least one fusion cavity.

5. The airfoil of claim 1, wherein the at least one fusion hole comprises a plurality of fusion holes, and wherein at least one fusion hole of the plurality of fusion holes extends between the tip and the frangible line.

6. The airfoil of claim 5, wherein the plurality of fusion holes each extends between the tip and the frangible line.

7. The airfoil of claim 1, wherein the at least one fusion hole extends along at least 5% of the span but less than 25% of the span.

8. The airfoil of claim 1, wherein the at least one fusion hole extends parallel to the span.

9. The airfoil of claim 1, wherein the airfoil further defines a pressure side and a suction side, and wherein the at least one fusion hole extends at least partially along the chord, at least partially toward one of the pressure or suction side, or at least partially along the chord and at least partially toward one of the pressure or suction side.

10. The airfoil of claim 1, wherein the at least one fusion cavity comprises at least one fusion channel extending from the tip to the frangible line.

11. The airfoil of claim 10, wherein the airfoil further defines a thickness extending between a pressure side and a suction side, and wherein the at least one fusion channel defines a thickness reduction of at least 10% of the thickness but less than 80% of the thickness.

12. The airfoil of claim 11, wherein the at least one fusion channel defines a variable thickness reduction.

13. The airfoil of claim 1, wherein at least one of the frangible airfoil portion or the residual airfoil portion includes a first material defining a first modulus of elasticity, the airfoil further comprising:
a filler material positioned within the at least one fusion cavity, at least partially filling the at least one fusion cavity, wherein the filler material includes a second modulus of elasticity less than the first modulus of elasticity.

14. An airfoil defining a span extending between a root and a tip and a chord at each point along the span extending between a leading edge and a trailing edge, the airfoil comprising:
a frangible airfoil portion at the tip extending between the leading edge and the trailing edge and extending between the tip and a frangible line along the span, the frangible airfoil portion including an exterior surface, wherein the exterior surface at least partially defines at least one fusion cavity, with a portion of the at least one fusion cavity closest the root at least partially defining the frangible line; and
a residual airfoil portion extending from the frangible line to the root along the span, wherein the residual airfoil portion meets the frangible airfoil portion at the frangible line, the frangible line defining a point of detachment of the frangible airfoil portion during a failure mode of the airfoil;
wherein the at least one fusion cavity comprises at least one fusion channel, wherein the at least one fusion channel comprises a first fusion channel extending at least partially along the frangible line, and a second fusion channel extending along the exterior surface of the frangible airfoil portion.

15. The airfoil of claim 14, wherein the at least one fusion channel extends along the chord at a point along the span at least 10% but less than 50% of the span from the tip.

16. The airfoil of claim 14, wherein the first fusion channel extends along a full length of the frangible line.

17. The airfoil of claim 14, wherein the first fusion channel extends along at least 10% of the chord at a point along the span of the frangible line but less than the full chord at the point along the span of the frangible line.

18. The airfoil of claim 14, further comprising a filler material positioned within the at least one fusion cavity, at least partially filling the at least one fusion cavity.

19. The airfoil of claim 14, wherein the second fusion channel extends at least partially along the frangible line.

20. The airfoil of claim 14, wherein the second fusion channel extends at least partially along the chord at a point along the span between the frangible line and the tip.

* * * * *